(12) United States Patent
Huybrechts et al.

(10) Patent No.: US 6,902,820 B2
(45) Date of Patent: Jun. 7, 2005

(54) HIGH SOLID COATING COMPOSITIONS

(75) Inventors: Jos Huybrechts, Turnhout (BE); Ann Vaes, Koningshooikt (BE); Lieve Bastin, Heffen (BE); Leen Tanghe, Eernegem (BE)

(73) Assignee: E.I. du Pont de Nemours and Company, Wilmington, DE (US)

( * ) Notice: Subject to any disclaimer, the term of this patent is extended or adjusted under 35 U.S.C. 154(b) by 41 days.

(21) Appl. No.: 10/671,217

(22) Filed: Sep. 25, 2003

(65) Prior Publication Data

US 2004/0116645 A1 Jun. 17, 2004

Related U.S. Application Data

(60) Provisional application No. 60/419,234, filed on Oct. 17, 2002.

(51) Int. Cl.$^7$ .......................... B32B 27/36; C08F 20/00
(52) U.S. Cl. .................. 428/482; 528/302; 528/306; 528/307; 525/437; 525/440; 525/441; 525/443; 525/444; 525/445; 427/207.1; 427/340
(58) Field of Search ................................ 528/302, 306, 528/307; 525/437, 440, 441, 443, 444, 445; 428/482; 427/207.1, 340

(56) References Cited

U.S. PATENT DOCUMENTS 6,277,497 B1    8/2001    Aerts et al.

FOREIGN PATENT DOCUMENTS

BR    1528802    10/1978

*Primary Examiner*—Samuel A. Acquah
(74) *Attorney, Agent, or Firm*—Steven C. Benjamin

(57) ABSTRACT

Coating compositions comprising:

Figure 1:
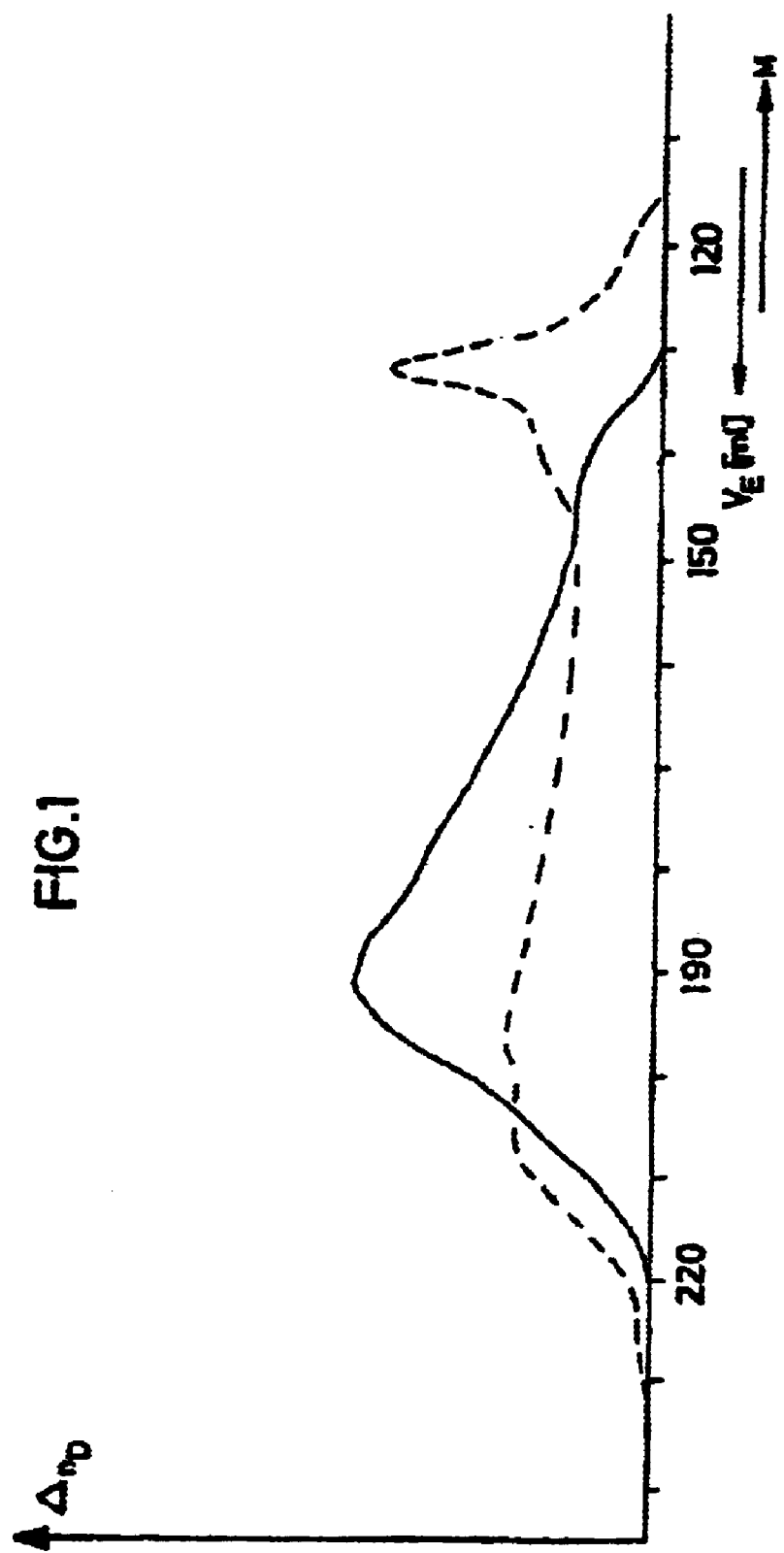
Figure 2:
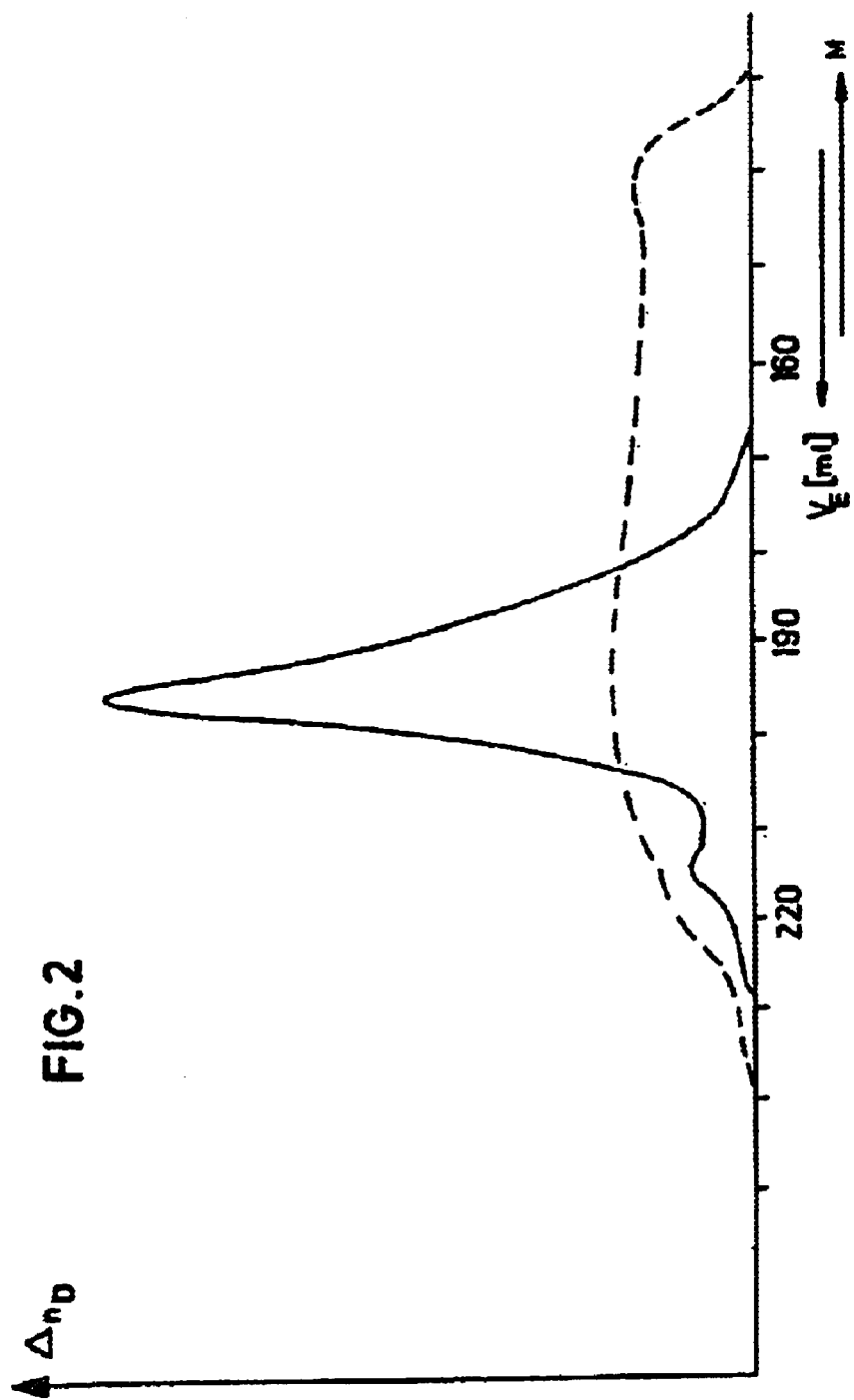
Figure 3:
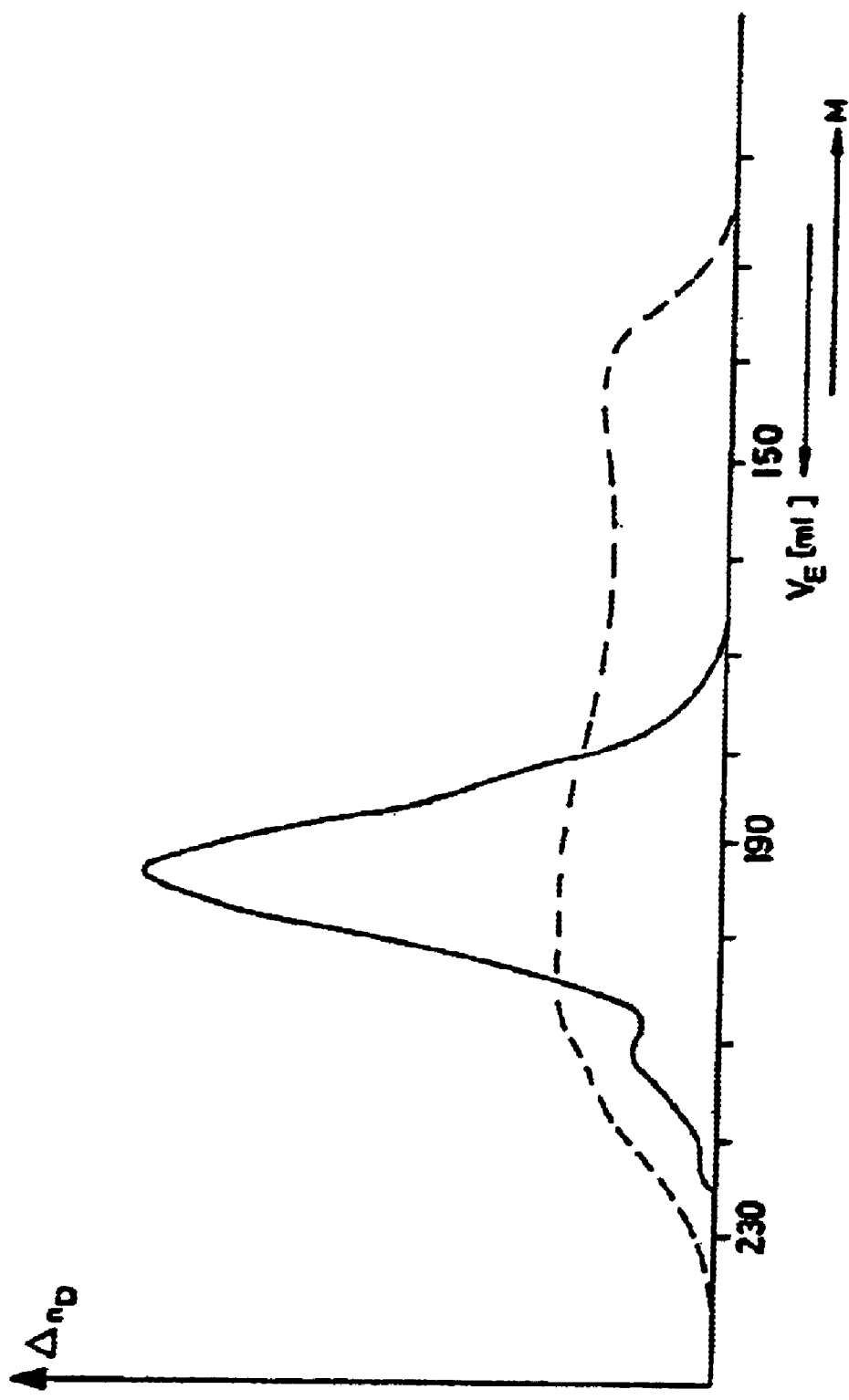
Figure 4:
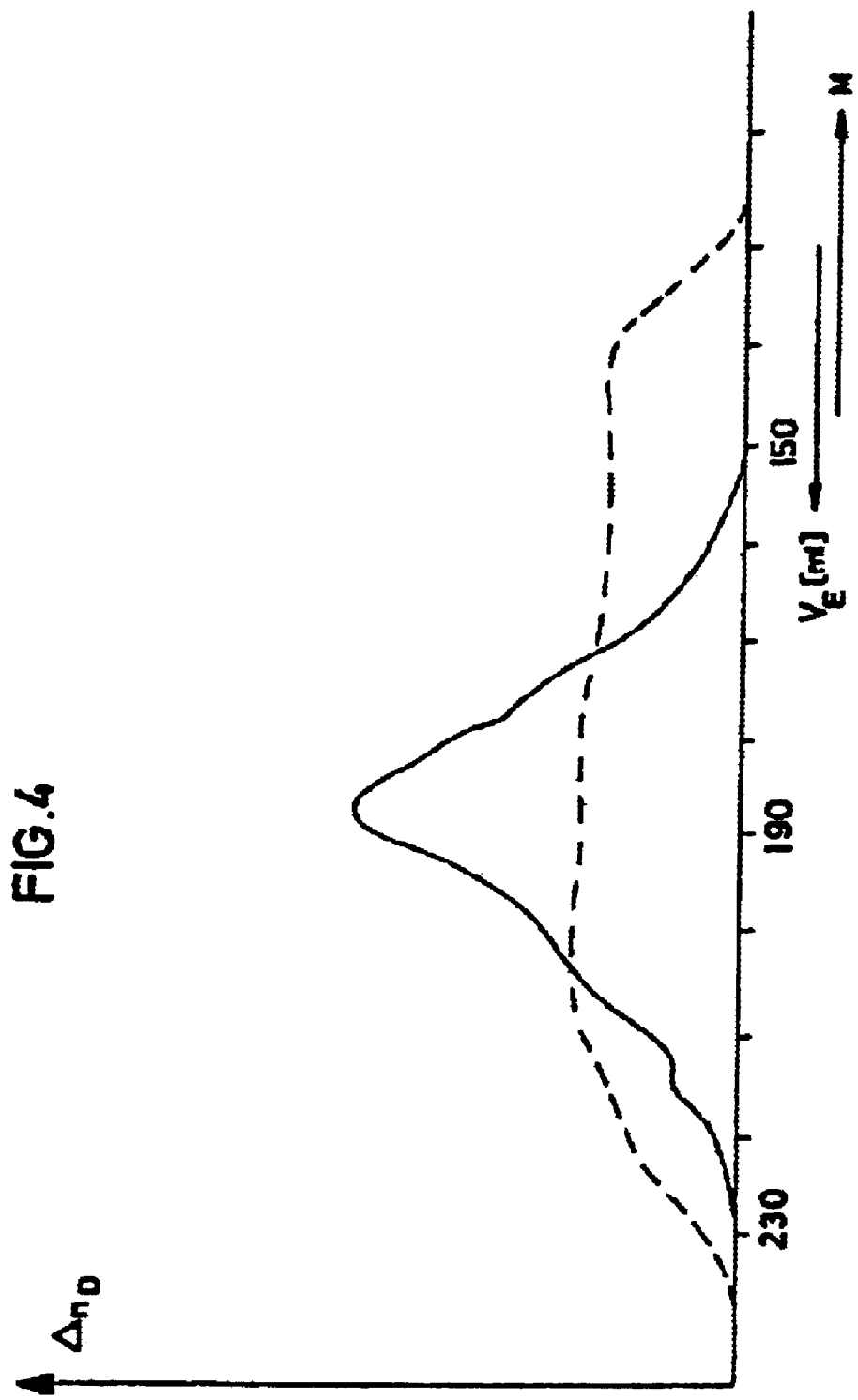
Figure 5:
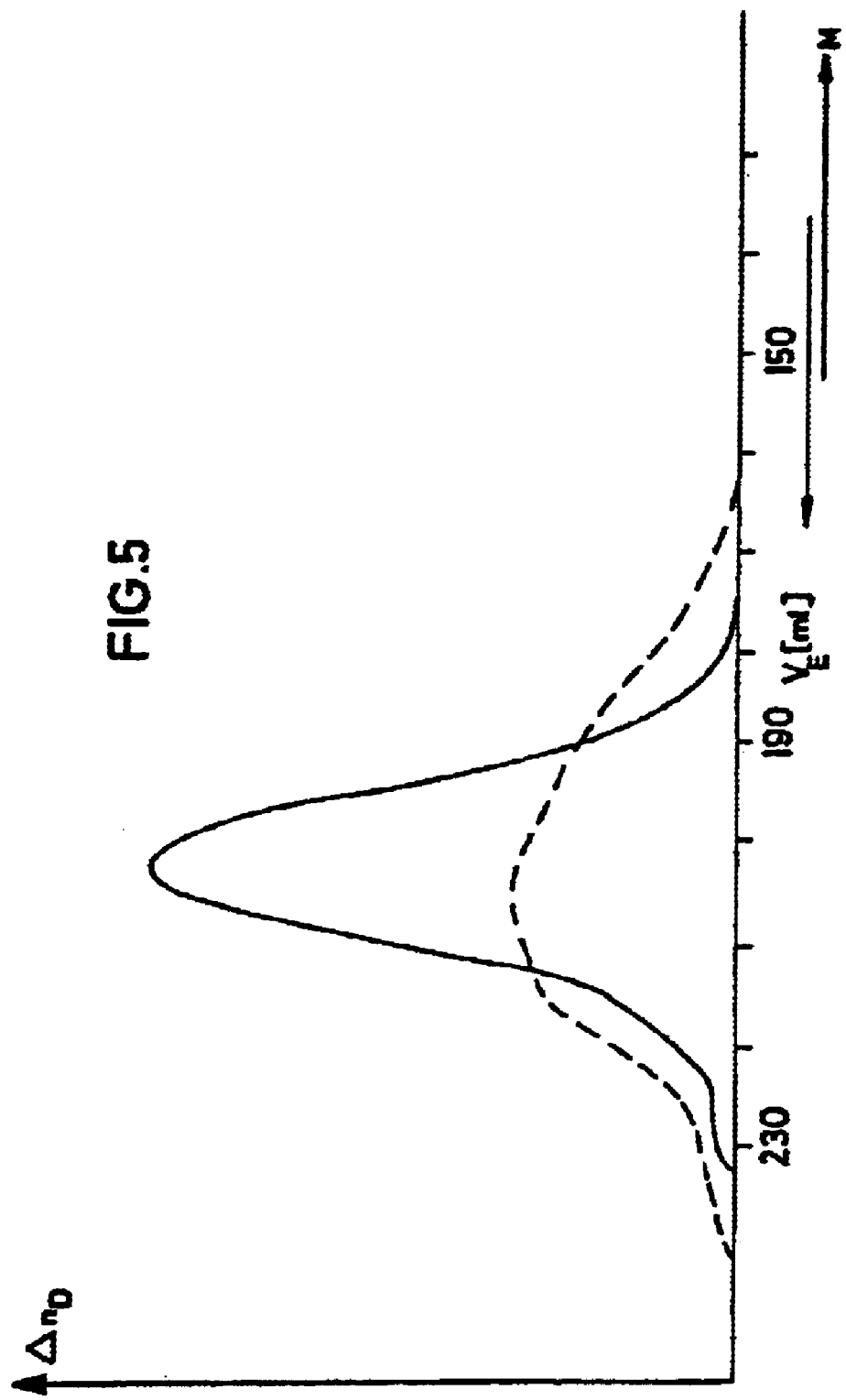
Figure 6:
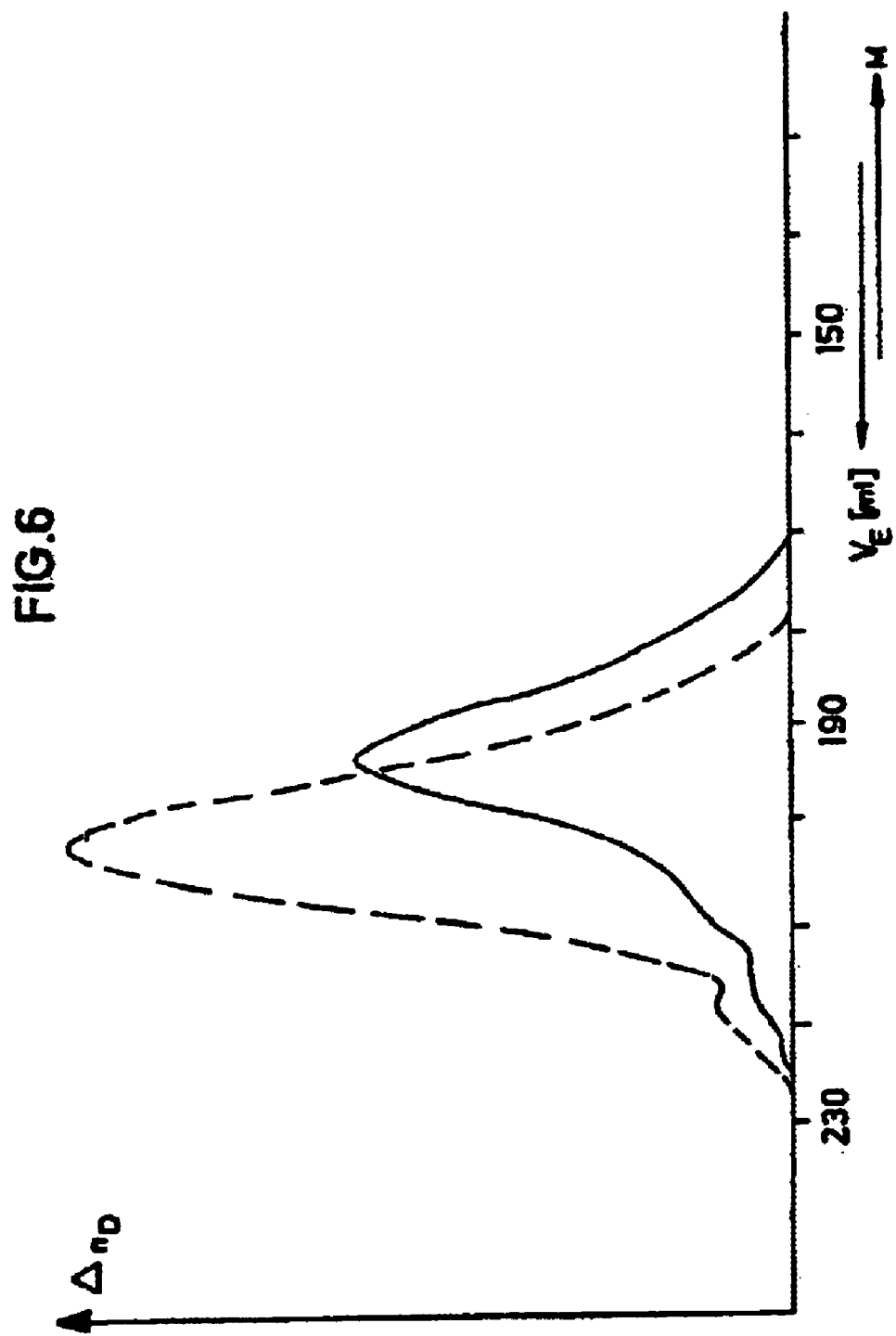
Figure 7:
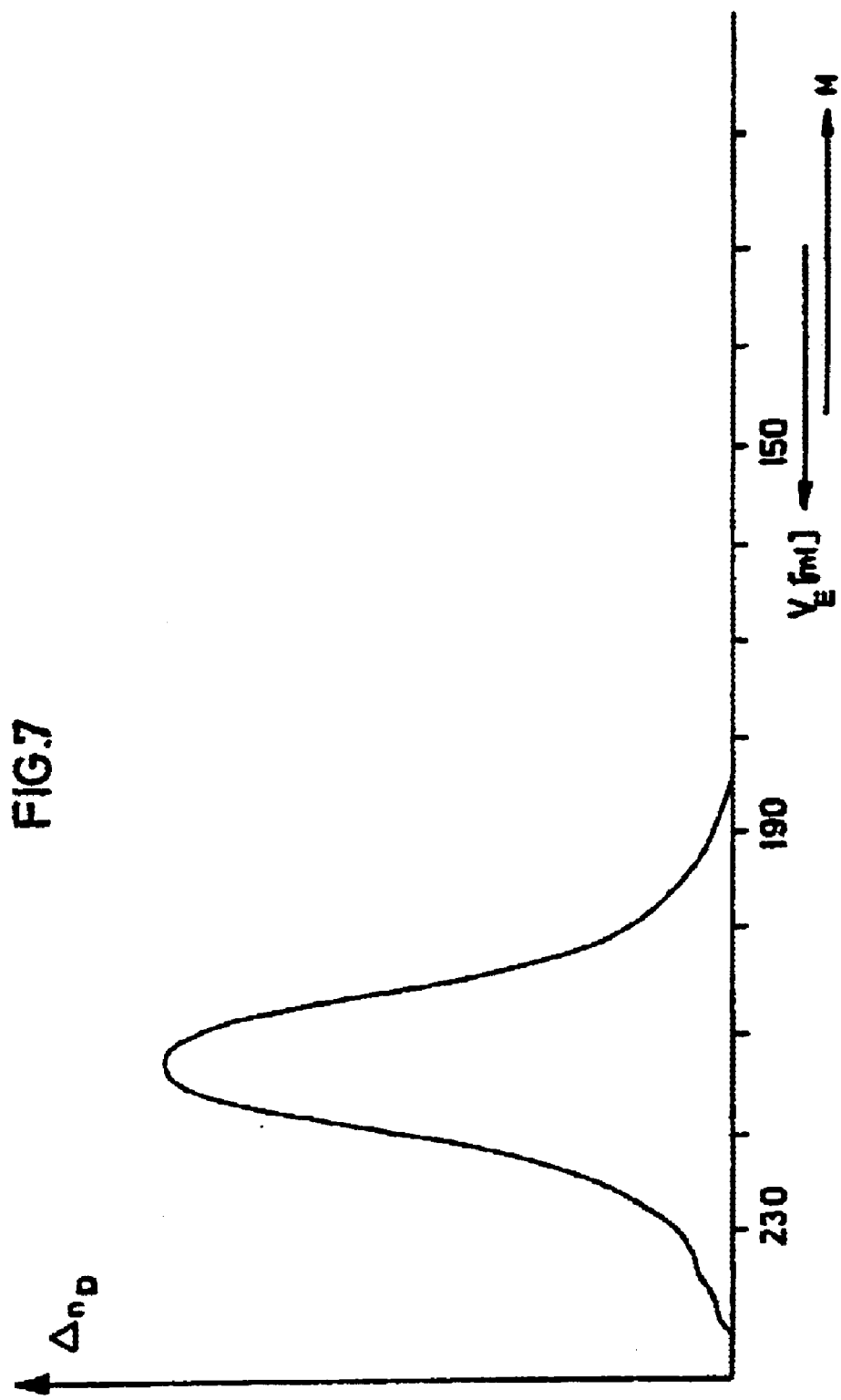
Figure 8:
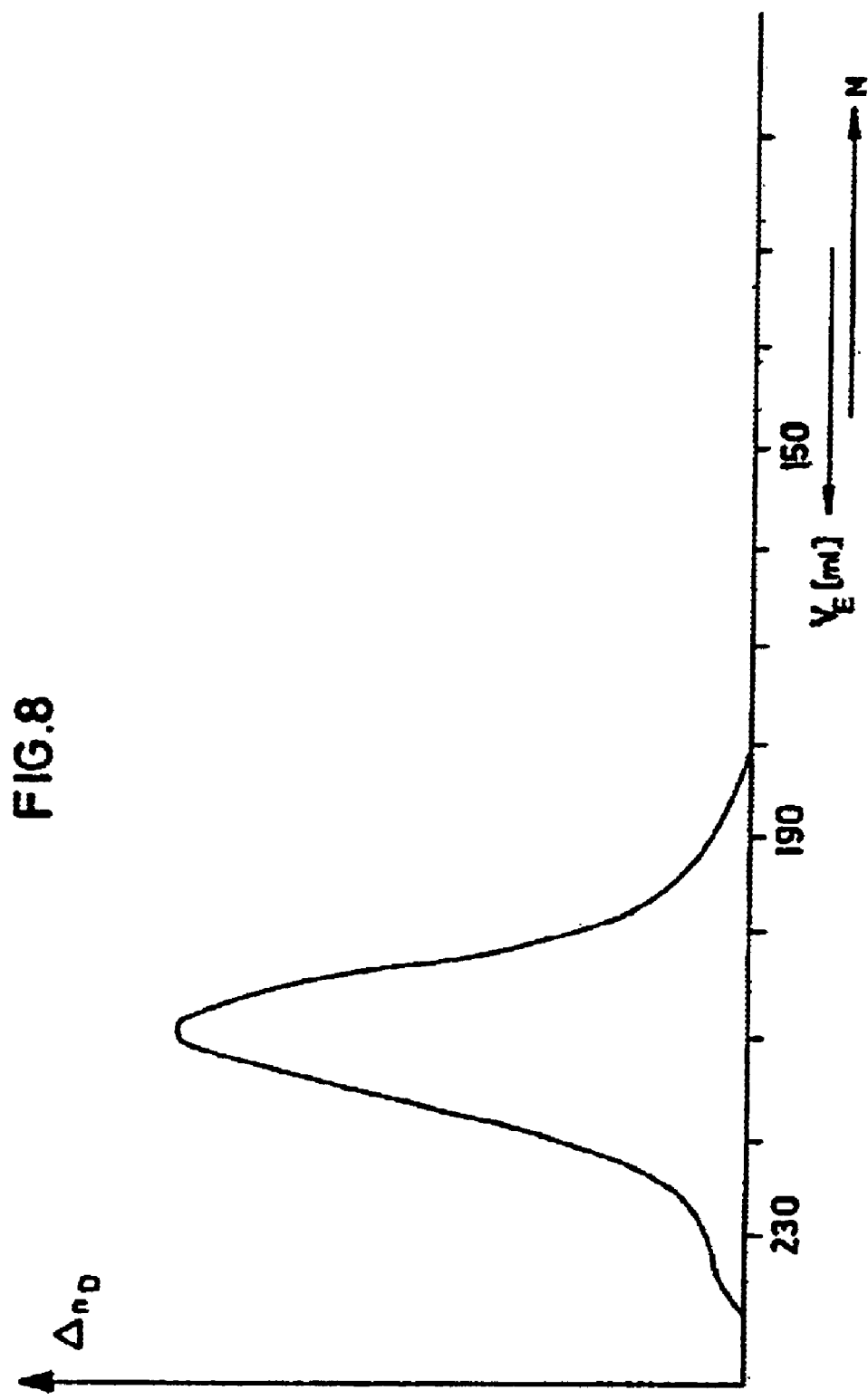
Figure 9:
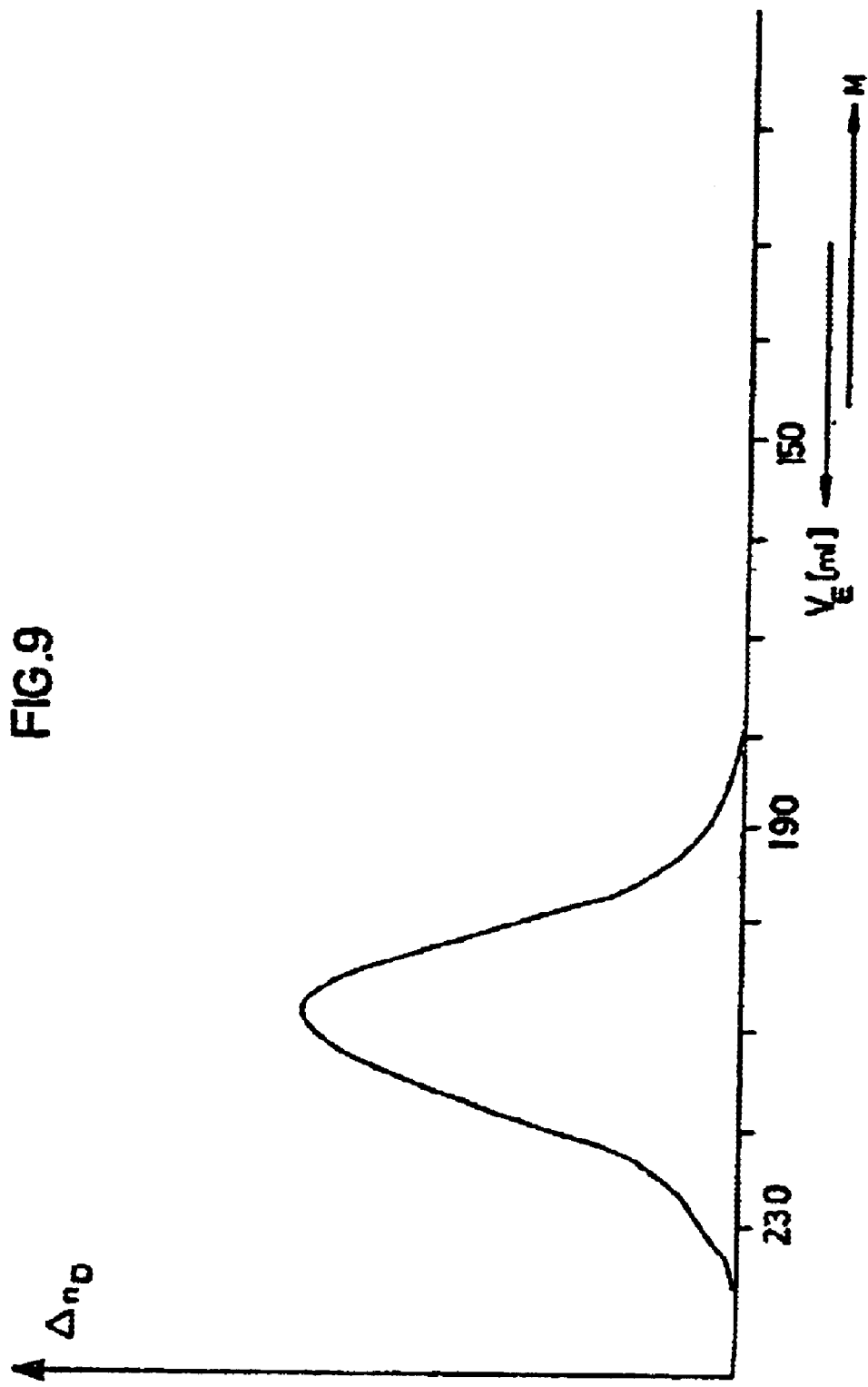
Figure 10:
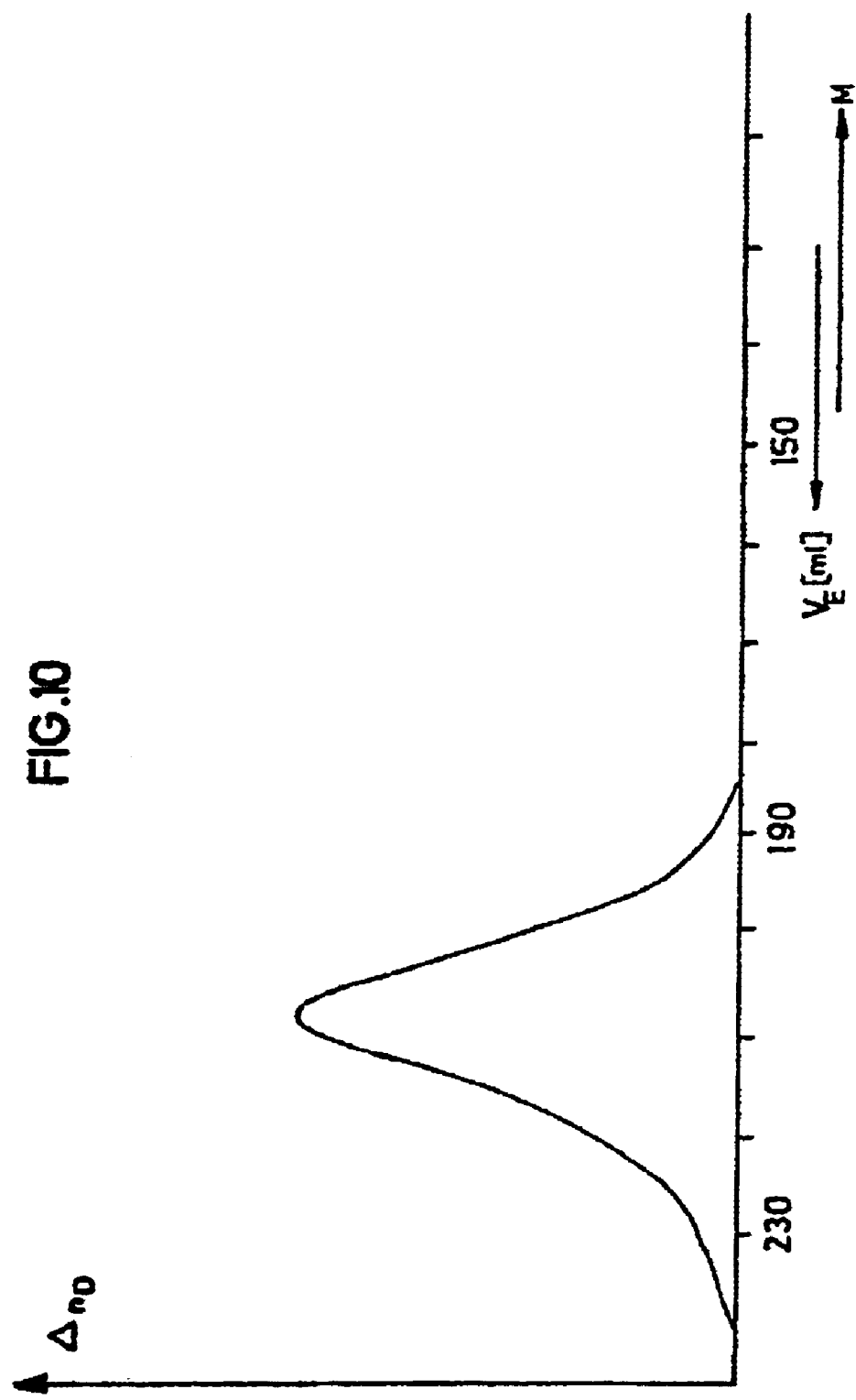

A) least one hydroxy-functional polyester with at least two hydroxyl groups per molecule, wherein at least one of which hydroxyl groups is a tertiary hydroxyl group, and the polyester has a number average molecular weight Mw of 200 to 5000, and contains as a structural element 10–90 wt-%, relative to the total quantity of polyester, of at least one acid ester group comprising a tertiary hydroxyl group and of the following general formula I

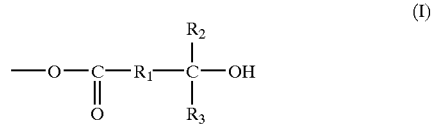

wherein $R_1$ is a single bond or a C1–C6 alkyl group, $R_2$ and $R_3$ mutually independently mean a C1–C4 alkyl group, B) optionally, at least one additional hydroxy-functional binder other than A) and C) at least one cross-linking agent which is capable of entering into a cross-linking reaction with the OH-groups of components A) and B.

14 Claims, 10 Drawing Sheets

HIGH SOLID COATING COMPOSITIONS

PRIORITY

This application claims priority from Provisional U.S. Patent Application Ser. No. 60/419,234, filed Oct. 17, 2002, incorporated herein by reference.

FIELD OF THE INVENTION

The invention relates to coating compositions having a low content of volatile organic compounds based on hydroxyfunctional polyesters and conventional crosslinkers.

DESCRIPTION OF RELATED ART

Due to enviromental friendly legislation, the coatings industry is under pressure to reduce volatile organic compounds (VOC) in coating formulations. Therefore, coating compositions are needed which have good physical drying properties and appearance, but which are inherently low in viscosity and require minimal dilution with solvents. The use of branched hydroxy-functional polyester derivatives with narrow molecular weight distribution and accordingly low viscosity in coating compositions has been described in British Patent 1,528,802. Here a polyhydric alcohol is reacted with an anhydride of a dicarboxylic acid to form the corresponding dicarboxylic acid half ester as an intermediate, which is further reacted with a glycidyl ester or glycidyl ether. However, automotive coating compositions with these polyester oligomers lead to coatings films with insufficient physical drying and with unsufficient curing times at lower temperatures.

U.S. Pat. No. 6,277,497 describes further branched hydroxy-functional polyester oligomers, which may be cured with conventional cross-linking agents. The polyester oligomers have tertiary ester end groups and are produced from polycarboxylic acids and tertiary glycidyl esters of carboxylic acids, preferably, pivalic acid glycidyl ester and/or from glycidyl-functional reaction products of polycarboxylic acids and epichlorohydrin and a tertiary acid, for example, pivalic acid. Coatings containing these products are still in need of further improvements with regard to initial hardness, tack-free time, pot life and VOC value. A more balanced relationship between solids content and viscosity is also required.

SUMMARY OF THE INVENTION

The present invention provides coating compositions based on oligomeric polyesters with tertiary hydroxyl groups, which coating compositions overcome the above-stated disadvantages of the prior art.

The invention relates to solvent-based coating compositions comprising:

A) at least one hydroxy-functional polyester with at least two hydroxyl groups per molecule, wherein at least one of the hydroxyl groups is a tertiary hydroxyl group, and the polyester has a number average molecular weight Mw of 200 to 5,000, preferably of 400 to 4,000, particularly preferably of 400–2,000, and the polyester contains as a structural element 10–90 wt-%, preferably 40–85 wt-%, particularly preferably 50–80 wt-%, relative to the total quantity of polyester, of acid ester groups comprising a tertiary hydroxyl group having the following general formula I

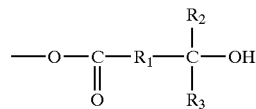

wherein $R_1$ is a single bond or a C1–C6 alkyl group, $R_2$ and $R_3$ mutually independently mean a C1–C4 alkyl group, B) optionally, at least one additional hydroxy-functional binder component other than A) and C) at least one cross-linking agent which is capable of entering into a cross-linking reaction with the hydroxyl groups of components A) and B).

DETAILED DESCRIPTION OF THE EMBODIMENTS

The resin solids of the coating composition according to the invention contain preferably at least 2 wt-% of the above-defined polyester A).

The hydroxy-functional polyesters A) may be produced by reacting: Aa) 10–80 wt-%, preferably 20–60 wt-% of at least one hydroxy-functional compound with at least two hydroxyl groups and a number average molecular weight Mn of 62–500, preferably of 90–250 with Ab) 20–90 wt-%, preferably 40–85 wt-% of at least one hydroxy-functional ester of a monocarboxylic acid of the following general formula II

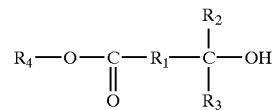

wherein $R_1$, $R_2$ and $R_3$ are defined above and $R_4$ is a C1–C4 alkyl group and wherein the proportions of Aa) and Ab) add up to 100 wt-%.

The polyesters (component A) may be produced by conventional transesterification known to the person skilled in the art. The transesterification reaction may be catalyzed, for example, by organotin compounds, such as, dibutyltin oxide, organotitanates, organozirconates and alkali metall hydroxides such as LiOH or KOH.

The hydroxy-functional compounds with at least two hydroxyl groups (component Aa) to be used in the synthesis of the polyesters A) comprise polyols having 2 to 15 carbon atoms per molecule. Examples of these are (cyclo)aliphatic polyols, which are within a molecular weight range from approximately 62 to 250, such as, for example, ethylene glycol, diethylene glycol, butanediol, 1,6-hexanediol, decanediol, neopentyl glycol, trimethylolpropane, ditrimethylolpropane, trimethylolethane, glycerol, monopentaerythritol, dipentaerythritol, tripentaerythritol, cyclohexanediol, cycohexanedimethanol. Tri- or polyfunctional hydroxyl compounds which may be reacted to yield branched polyesters are preferably used. Examples of preferred hydroxyl compounds Aa) are trimethylolpropane, trimethylolethane, glycerine, ditrimethylolpropane, monopentaerythritol and dipentaerythritol. Mixtures of these hydroxyl-functional compounds Aa) can also be used.

The esters of monocarboxylic acids with tertiary hydroxyl groups (component Ab) to be used in the synthesis of the polyesters A) comprise compounds of the general formula II.

The compounds Ab) preferably comprise 2-hydroxyisobutyric acid alkyl esters with 1–4 C atoms in the alkyl residue, particularly preferably 2-hydroxyisobutyric acid methyl ester and/or 2-hydroxyisobutyric acid ethyl ester. 2-Hydroxyisobutyric acid methyl ester is in particular preferred.

Branched polyesters A) based on monopentaerythritol, dipentaerythritol, trimethylolpropane and/or ditrimethylolpropane (component Aa) and 2-hydroxyisobutyric acid methyl and/or ethyl esters (component Ab) are particularly preferably used according to the invention. It is preferred, for example, to react 1 mol of monopentaerythritol or ditrimethylolpropane with 1–4 mole(s) of 2-hydroxyisobutyric acid methyl ester.

The polyesters A) may optionally additionally be further modified. In one development, the polyesters A, provided that they still contain secondary or primary hydroxyl groups after the above-described reaction, may be reacted first with polycarboxylic acids or the anhydrides thereof and then with glycidyl esters and/or glycidyl ethers. Polycarboxylic acids which may, for example, be used are polycarboxylic acids with 4 to 54 carbon atoms. Examples are polycarboxylic acids, which are within a molecular weight range from approximately 116 to 1,000, for example, maleic acid, phthalic acid, isophthalic acid, trimellitic acid, dodecanedicarboxylic acid, tetrahydrophthalic acid, hexahydrophthalic acid, methylhexahydrophthalic acid, cyclohexane-1,2- and -1,4-dicarboxylic acid, sebacic acid, adipic acid and dimer fatty acids, such as, commercially available Pryol 1009 and 1010. Acid anhydrides may preferably be used. Examples of usable acid anhydrides are hexahydrophthalic anhydride, methylhexahydrophthalic anhydride, phthalic anhydride and trimellitic anhydride.

Glycidyl esters which may, for example, be used are glycidyl esters of alpha,beta-unsaturated monocarboxylic acids, such as, for example, acrylic acid or methacrylic acid, glycidyl esters of aromatic monocarboxylic acids, for example, glycidyl esters of benzoic acid or also glycidyl esters of saturated alpha-alkylalkanemonocarboxylic acids or of saturated alpha,alpha-dialkylalkanemonocarboxylic acids. Glycidyl esters which are preferably used are those of saturated alpha,alpha-dialkylalkanemonocarboxylic acids with 7–13 C atoms per molecule, particularly preferably with 9–11 C atoms per molecule. These glycidyl esters are commercially available, for example, as Cardura® E10.

Glycidyl ethers which may be used are, for example, the glycidyl ethers of phenols.

The further reaction of the polyesters A) with the polycarboxylic acids proceeds by conventional melt condensation at temperatures of approximately 160 to 240° C.

The stated preferred reaction of the polyesters A) with anhydrides of dicarboxylic acids proceeds by ring-opening polycondensation at temperatures of approximately 100–170° C. The carboxyl groups present are then reacted with equimolar quantities of glycidyl esters or glycidyl ethers. The above-stated reactions are conventional methods known to the person skilled in the art which thus require no further explanation.

For example, 1 mole of monopentaerythritol or ditrimethylolpropane may be reacted with 2 mol of compounds Ab) and 1–2 mole(s) of a dicarboxylic anhydride, for example, hexahydrophthalic anhydride, and then correspondingly with 1–2 mole(s) of glycidyl ester, for example, the glycidyl ester of versatic acid.

In addition to the polyesters A) essential to the invention, the coating compositions may contain further hydroxy-functional binders B). The further hydroxy-functional binders B) comprise conventional hydroxy-functional resins such as are, for example, used in the production of single- or two-component cross-linkable, solvent-based coating compositions, in particular, in vehicle coating, and are sufficiently familiar to the person skilled in the art.

Binders containing hydroxyl groups which may be used individually or in combination are, for example, polyurethanes, polyesters and poly(meth)acrylates. These resins generally have a hydroxyl value of 20 to 250 mg of KOH/g and may optionally, additionally, be modified. Hydroxy-functional poly(meth)acrylates are preferably used, particularly preferably, poly(meth)acrylate resins having hydroxyl values of, for example, 80 to 200 mg of KOH/g, acid values of 0–30 mg of KOH/g. The hydroxy-functional poly(meth)acrylate resins have a preferred number average molecular weight Mn of 1,000–20,000, particularly preferably of 1,000–10,000.

The coating compositions according to the invention preferably contain 5–100 wt-% of polyesters A) and 0–95 wt-% of further hydroxy-functional binders B), wherein the total of weight percentages of A) and B) is 100 wt-%.

The coating compositions according to the invention contain as component C) at least one cross-linking agent which is capable of entering into a cross-linking reaction with the OH-groups of components A) and B). These may, for example, comprise polyisocyanates with free isocyanate groups, polyisocyanates with at least partially blocked isocyanate groups, amino resins and/or tris(alkoxycarbonylamino)triazines, such as for example 2,4,6-tris(methoxycarbonylamino)-1,3,5-triazine and 2,4,6-tris(butoxycarbonylamino)-1,3,5-triazine.

The polyisocyanates comprise, for example, any desired organic polyisocyanates having aliphatically, cycloaliphatically, araliphatically and/or aromatically attached free isocyanate groups. The polyisocyanates preferably comprise polyisocyanates or polyisocyanate mixtures having exclusively aliphatically and/or cycloaliphatically attached isocyanate groups with an average NCO functionality of 1.5 to 5, preferably of 2 to 4.

Particularly suitable compounds are, for example, so-called "coating polyisocyanates" based on hexamethylene diisocyanate (HDI), 1-isocyanato-3,5,5-trimethyl-5-isocyanatomethylcyclohexane (IPDI) and/or bis(isocyanatocyclohexyl)methane and the per se known derivatives of said diisocyanates comprising biuret, allophanate, urethane and/or isocyanurate groups. Triisocyanates, such as, triisocyanatononane may also be used.

Sterically hindered polyisocyanates are likewise also suitable. Examples of these are 1,1,6,6-tetramethylhexamethylene diisocyanate, 1,5-dibutylpentamethyl diisocyanate, p- or m-tetramethylxylylene diisocyanate and the corresponding hydrogenated homologues.

Diisocyanates may in principle be reacted in conventional manner to yield more highly functional compounds, for example by trimerization or by reaction with water or polyols, such as for example trimethylolpropane or glycerol. Corresponding prepolymers containing isocyanate groups may also be used as di- and/or polyisocyanates. The polyisocyanate cross-linking agents may be used individually or in combination.

Blocked or partially blocked polyisocyanates may also be used as the cross-linking component. Examples of blocked or partially blocked isocyanates are any desired di- and/or polyisocyanates, in which the isocyanate groups or a proportion of the isocyanate groups have been reacted with compounds that contain active hydrogen. These comprise, for example, polyisocyanates as have already been described above. Trifunctional, aromatic and/or aliphatic blocked or partially blocked isocyanates having a number average molar mass of for example 500–1500 are preferred. Low molecular weight compounds containing active hydrogen for blocking NCO groups are known. Examples of these are aliphatic or cycloaliphatic alcohols, dialkylaminoalcohols, oximes, lactams, imides, hydroxyalkylesters, malonic acid or acetoacetic acid esters.

Amino resins are likewise suitable as cross-linking agents. These resins are produced in accordance with the prior art and are offered for sale as commercial products by many companies. Examples of such amino resins are amine/formaldehyde condensation resins which are obtained by reacting aldehydes with melamine, guanamine, benzoguanamine or dicyandiamide. The alcohol groups of the aldehyde condensation products are then partially or completely etherified with alcohols.

The coating compositions may also contain low molecular weight reactive components, so-called "reactive diluents", which are capable of reacting with the particular cross-linking components. These may, for example, comprise hydroxy- or amino-functional reactive diluents.

The hydroxy-functional components A) and B) and the corresponding cross-linking agents C) are each used in the coating compositions according to the invention in quantity ratios such that the equivalent ratio of hydroxyl groups of components A) and B) to the groups of the cross-linking component C) which are reactive towards hydroxyl groups is for example 5:1 to 1:5, preferably 3:1 to 1:3, particularly preferably of 1.5:1 to 1:1.5.

The coating compositions according to the invention may contain pigments and/or extenders. Suitable pigments are any color- and/or special effect-imparting pigments of an organic or inorganic nature, which are conventional in coatings. Examples of inorganic or organic coloring pigments are titanium dioxide, micronized titanium dioxide, iron oxide pigments, carbon black, azo pigments, phthalocyanine pigments, quinacridone or pyrrolopyrrole pigments. Examples of special effect pigments are metal pigments, for example made from aluminium or copper, interference pigments, such as, for example, titanium dioxide coated aluminium, coated mica, graphite special effect pigments and iron oxide in flake form. Examples of extenders are silicon dioxide, barium sulfate, talcum, aluminium silicate and magnesium silicate.

The coating compositions may contain conventional coating additives. The additives comprise the conventional additives usable in the coatings sector. Examples of such additives are light stabilizers, for example, based on benzotriazoles and HALS (hindered amme light stabilizer) compound, levelling agents based on (meth)acrylic homopolymers or silicone oils, rheological agents, such as, highly disperse silica or polymeric urea compounds, thickeners, such as, partially cross-linked polycarboxylic acid or polyurethanes, antifoaming agents, wetting agents, catalysts for the cross-linking reaction of the OH-functional binders, for example, organic metal salts, such as, dibutyltin dilaurate, zinc naphthenate and compounds containing tertiary amino groups, such as, triethylamine for the cross-linking reaction with polyisocyanates. The additives are used in conventional amounts familiar to the person skilled in the art.

The coating compositions according to the invention may contain organic solvents. The organic solvents comprise conventional coating solvents. Examples of such solvents are mono- or polyhydric alcohols, for example, propanol, butanol, hexanol; glycol ethers or esters, for example, ethylene glycol monobutyl ether, diethylene glycol monobutyl ether, diethylene glycol mono- and dialkyl ethers, dipropylene glycol mono- and dialkyl ethers, ethylene glycol monoethyl ether acetate, ethylene glycol monobutyl ether acetate, diethylene glycol monobutyl ether acetate, esters, such as, for example, butyl acetate, isobutyl acetate, amyl acetate, glycols, for example, ethylene glycol, propylene glycol and the oligomers thereof, N-methylpyrrolidone and ketones, for example, methyl ethyl ketone, methyl amyl ketone, acetone, cyclohexanone; aromatic or aliphatic hydrocarbons, for example, toluene, xylene or linear or branched aliphatic C6–C12 hydrocarbons.

The coating compositions according to the invention may be prepared as transparent or pigmented coating compositions. Transparent coating compositions are produced by mixing the individual components together and thoroughly homogenizing them in conventional manner. When producing pigmented coating compositions it is possible to proceed by initially mixing a proportion of the hydroxy-functional component A) and optionally, the further hydroxy-functional binder B), with the pigments and/or extenders and the additives and solvents conventional in coatings and grinding the mixture in grinding units. The ground material is subsequently made up with the remaining quantity of binders.

Depending upon the type of cross-linking agent, single-component or two-component coating compositions may be formulated according to the invention. If polyisocyanates having free isocyanate groups are used as the cross-linking agent, the coating compositions are two-component systems, i.e., the binder components containing hydroxyl groups, optionally, together with pigments, extenders and conventional coating additives, and the polyisocyanate component may be mixed together only shortly before application. The coating compositions may, in principle, additionally be adjusted to spraying viscosity with organic solvents before being applied.

The coating compositions according to the invention may be applied using known processes, in particular by spraying. The resultant coatings may be cured at room temperature or be forced dried at higher temperatures, for example, of up to 80° C., preferably at 20 to 60° C. They may, however, also be cured at higher temperatures of for example 80–160° C.

The coating compositions according to the invention are suitable for vehicle and industrial coating. In the context of vehicle coating, the coating compositions may be used both for vehicle original coating and for repair coating of vehicles and vehicle parts. Baking temperatures of 60–160° C., preferably of 110–140° C., are, for example, used for vehicle original coating. Curing temperatures of 20° C. to 80° C., in particular of 40–60° C., are for example used for vehicle repair coating.

While exhibiting rapid drying and good reactivity, the coating compositions according to the invention have an adequate pot life, the coatings produced therefrom are rapidly tack-free and exhibit very good initial hardness.

The present invention is described below in more detail by means of examples. All parts and percentages are on a weight basis unless otherwise indicated. Molecular weights are determined by gel permeation chromatography using a polystyrene standard.

EXAMPLES

Example 1

Polyester Oligomer 1

The following constituents were changed to a reaction vessel equipped with a stirrer, a thermometer, a packed column filled with glass beads, a water seperator on top of the packed column and a condensor: 250 grams of di-trimethylol propane (DTMP), 472 grams of 2-hydroxyisobutyric acid methyl ester (HIBAM) and 1.18 grams of dibutyl tinoxide (DBTO). The mixture was heated to its reflux temperature of about 144° C. The temperature was gradually increased while methanol formed as a byproduct of the transesterification was distilled off.

The mixture was heated to about 210° C. after which 72% of the total theoretical amount of methanol was stripped off. After cooling down, the reaction product was a viscous liquid (Viscosity Z4 in Gardner-Holdt) with a molecular weight distribution of Mn/Mw=750/780.

Example 2

Polyester Oligomer 2

The following constituents were changed into a vessel equipped as described in Example 1:136 grams of mono-pentaerythritol (MPE), 236 grams of HIBAM and 1.48 grams of DBTO. The contents were heated up to about 142° C. at which time methanol started to form which was stripped off. The contents were heated to about 231° C. to allow 60% of the theoretical amount of methanol to distill off. The contents of the reactor were cooled down to about 120° C. at which point 149.52 grams of n-butylacetate (BuAc) and 336 grams of methyl hexahydrophtalic anhydride (MHHPA) were added. The contents were refluxed for about 1 hour at 145° C. after which 500 grams of versatic acid glycidyl ester (Cardura® E10 from Resolution) were added followed by a rinsing step of 35 grams BuAc (butyl acetate). The reactor contents were refluxed till the acid value was below 4 after which 100 grams of BuAc were added.

The polyester oligomer had a solids content of 80.3% at a Gardner-Holdt viscosity of V, an acid value of 3.5 and a molecular weight distribution of Mn/Mw=1020/1250.

Example 3

Polyester Oligomer 3

The following constituents were changed into a vessel, equipped as described in Example 1:136 grams of MPE, 236 grams of HIBAM and 0.24 grams of DBTO. The contents were heated up to about 142° C. at which time methanol started to form, which was stripped off. The contents were heated to about 231° C. to allow 60% of the theoretical amount of methanol to distill off. The contents of the reactor were cooled down to about 120° C. at which point 159.76 grams of BuAc and 168 grams of MHHPA were added. The contents were refluxed for about 1 hour at 145° C. after which 250 grams of versatic acid glycidyl ester (Cardura® E10 from Resolution) were added followed by a rinsing step of 20 grams BuAc. The reactor contents were refluxed until the acid value was below 5 after which 30 grams of BuAc were added.

The polyester oligomer had a solids content of 79.8% at a Gardner-Holdt viscosity of T+¼, an acid value of 4.3 and a molecular weight distribution of Mn/Mw=840/1040.

Example 4

Polyester Oligomer 4

The overall procedure of Example 3 was followed with 136 grams of MPE, 236 grams of HIBAM, 0.57 grams of DBTO in which 25% of the theoretical amount of methanol were stripped off. Next were added 149.52 grams of BuAc, 336 grams of MHHPA, 500 grams of Cardura® E10 and 35 grams of BuAc was added in a rinsing step and finally 100 grams of BuAc thinning was added in a thinning step.

The polyester oligomer had a solids content of 79% at a Gardner-Holdt viscosity of U+½, an acid value of 6 and a molecular weight distribution of Mn/Mw=860/1160.

Example 5

Polyester Oligomer 5

The procedure of example 4 was followed with 136 grams of MPE, 118 grams of HIBAM, 0.53 grams of DBTO in which 52% of the theoretical amount of methanol were stripped off. This was followed with 140.48 grams of BuAc, 336 grams of MHHPA, 500 grams of Cardura® E10, 23 grams of BuAc for rinsing and 100 grams of BuAc for thinning.

The polyester oligomer had a solids content of 81.1% at a Gardner-Holdt viscosity of W–¼, an acid value of 7.6 and a molecular weight distribution of Mn/Mw=850/1180.

Comparative Example 1

Oligomer of Prior Art as in GB 1,528,802

250 grams of di-trimethylolpropane were refluxed with 252 grams of methyl hexahydrophtalic anhydride for about one hour in 175 grams of BuAc. Then 375 grams of Cardura® E10 were added followed by 20 grams of BuAc and the mixture was refluxed until the acid value below 3.

The polyester oligomer had a solids content of 82.8% at a Gardner-Holdt viscosity of Y, an acid value of 2.7 and a molecular weight distribution of Mn/Mw=920/1180.

Comparative Example 2

Oligomer of Prior Art as in U.S. Pat. No. 6,277,497

According to Example 8 of U.S. Pat. No. 6,277,497 a oligoester was prepared as follows:

136 grams of MPE were refluxed with 504 grams of methyl hexahydrophtalic anhydride for about one hour in 175 grams of BuAc.

Then 480 grams of glycidyl pivalate were added followed by such an amount of BuAc that a theoretical overall solids of 80% in BuAc was achieved. The mixture was refluxed until the acid value was below 1.

The polyester oligomer had a solids content of 78.2% at Gardner-Holdt viscosity of Z2+½, an acid value of 0.7 and a molecular weight distribution of Mn/Mw=1180/1980.

Examples 6–9

Clear Coat Compositions+Comparative Clear Coat

The following ingredients were mixed together to form clear coat compositions according to this invention (CC 1–CC 3) and a comparative clear coat (CCC 1) using the oligoester according to comparative example 1.

CC=clear coat; CCC=comparative clear coat
DBTL=Dibutyl tin dilaurate; DABCO=1,4-Diazobicyclo-2,2,2-octane
The data in the following tables are parts by weight.

|  | Example | | | |
|---|---|---|---|---|
|  | 6 (CC 1) | 7 (CC 2) | 8 (CC 3) | 9 (CCC 1) |
| Methylamylketone | 21.47 | 21.47 | 21.47 | 21.47 |
| Diethylene glycol mono butylether | 1.01 | 1.01 | 1.01 | 1.01 |
| Byk 331 (Levelling agent, Byk Chemie) | 0.1 | 0.1 | 0.1 | 0.1 |
| Tegoflow 300 (Flow agent, Tego Chemie) | 0.31 | 0.31 | 0.31 | 0.31 |
| 10% DBTDL in Xylene | 0.25 | 0.25 | 0.25 | 0.0 |
| 10% DABCO in BuAc/Propyleneglycol methylether | 0.5 | 0.5 | 0.5 | 0.5 |
| N,N'-Dimethyldodecylamine | 0.25 | 0.25 | 0.25 | 0.25 |
| Tinuvin ® 292 (light stabilizer of Clariant) | 0.4 | 0.4 | 0.4 | 0.4 |
| Tinuvin ® 1130 (light stabilizer of Clariant) | 0.8 | 0.8 | 0.8 | 0.8 |
| Acrylic resin (1) | 57.58 | 57.58 | 57.58 | 57.58 |
| Acrylic resin (2) | 7.68 | 7.68 | 7.68 | 7.68 |
| Polyester oligomer 1 | 6.92 | | | |
| Polyester oligomer 2 | | 8.62 | | |
| Polyester oligomer 3 | | | 8.67 | |
| Comparative oligomer 1 | | | | 8.38 |
| Butyl Acetate | 0.43 | 0.73 | 0.68 | 0.97 |

(1) Acrylic copolymer with hydroxyl value of 126 and weight average molecular weight of 5000
(2) Acrylic copolymer with hydroxyl value of 86 and weight average molecular weight of 10000

100 parts of each of the above clear coat formulations were blended with 37.1 parts of an polyisocyanate activator which consists of 8.9 parts BuAc, 6.08 parts of xylene, 2.43 parts of a 1% DBTDL solution in xylene, 66.50 parts of Desmodur® N3390 (1,6-hexamethylene diisocyanate trimer, 90% solids in butyl acetate from; Bayer) and 15.09 parts of Desmodur® Z4470 (70% solids isophorone diisocyanate trimer in butyl acetate from; Bayer).

The resulting compositions had a viscosity of about 18 seconds (Din Cup 4 at 20° C.) ready to spray, a binder solids content of about 56% and a VOC content of about 3.5 lbs/gal. The potlife of the compositions was measured by measuring the viscosity increase as a function of time. The clear coat compositions were sprayed after a flash-off time over commercial dark blue solvent borne basecoats on panels. The basecoat film build was about 20 microns dry film thickness while the clear coat thickness was about 50 microns dry film thickness. Finally, the base coat and the clear coat were baked 10 minutes at 60° C.

|  | CC 1 | CC 2 | CC 3 | CCC 1 |
|---|---|---|---|---|
| Potlife: | | | | |
| Viscosity initial/in seconds | 17.4 | 18 | 18 | 17.8 |
| After 1 hour | 21.8 | 23 | 20.9 | 20.2 |
| After 90 minutes | 28.2 | 29.2 | 23 | 22.6 |
| Persoz Hardness | | | | |
| After 1 hour | 84 | 87 | 76 | 66 |
| After 4 hours | 127 | 142 | 126 | 116 |
| After one day | 212 | 230 | 237 | 218 |
| Fisher Hardness | | | | |
| After 1 hour | 0.63 | 0.73 | 0.39 | 0.26 |
| After 4 hours | 1.65 | 2.02 | 1.33 | 1.09 |
| After 1 day | 7.6 | 8.7 | 9.0 | 8.8 |
| Tack free warm (after baking) | ok | ok | ok | not ok |
| Tack free cold (after 30 minutes) | ok | ok | ok | ok |

Potlife: time in which doubling of initial viscosity occurs.

The examples show that the overall drying of the clear coats according to this invention as measured by early hardness development (after 1 hour) and tack free warm is better than the overall drying of the comparative clear coat. Especially advantageous is, that the coatings are tack free warm out of the oven as well as tack free cold (after 30 minutes). This is important in repair body shops, where it is required for effectiveness reasons to continue working on the substrates shortly after being baked in the oven.

Examples 10 and 11

Solid Topcoat Compositions

The following ingredients were mixed together to form solid topcoat compositions (TC 1–TC 2) according to this invention:
TC=topcoat
The data in the following tables are parts by weight

|  | Example | |
|---|---|---|
|  | 10 (TC 1) | 11 (TC 2) |
| Polyester oligomer 4 | 79.59 | |
| Polyester oligomer 5 | | 79.59 |
| Methyl amyl ketone | 15.44 | 15.44 |
| Tinuvin ® 292 | 0.7 | 0.7 |
| 1% Solution DBTDL in xylene | 2.3 | 2.3 |
| Byk ® 331 (Levelling agent, Byk Chemie) | 0.1 | 0.1 |
| Byk ® 361 (Flow agent, Byk Chemie) | 0.24 | 0.24 |
| Diethylene glycol monobutylether | 0.95 | 0.95 |
| Acetic acid | 0.68 | 0.68 |

Blue topcoat formulations were prepared by blending 76.2 parts of the composition of Example 10 (TC 1) and 76.2 parts of the composition of Example 11 (TC 2) each with 6.8 parts of a black dispersion (containing 6.26% Carbon black A-148-0 from Clariant), 3.9 parts of a blue dispersion (containing 10.62% Endurophthal B1-617D from Clariant), 2.6 parts of a white dispersion (containing 56.39% Ti-pure® R960-09 from Dupont), 1.4 parts of a violet dispersion (containing 6.02% Indafast Violet B4018 from Bayer) and 9.1 parts of a thinner consisting of 78% methyl amyl ketone, 19.5% diisobutylketon and 2.5% of Byk® 322 (Byk Chemie).

An activator solution was prepared by blending 10.53 parts BuAc with 7.821 parts xylene, 3.43 parts of a 1% DBTDL solution in xylene and 78.23 parts of Desmodur® N3390 (90% solids 1,6-hexamethylene diisocyanate trimer; Bayer).

Each of the above pigmented topcoats TC 1 and TC 2 were blended with the activator in a ratio of 3/1 by volume.

The coating composition had a potlife of more than 1 hour.

Each of the top coats were sprayed onto a steel panel precoated with a commercial primer surfacer and cured 30 minutes at 60° C.

The applied and cured coatings were dry to assemble 4 hours after curing and had a Persoz hardness after one week of about 137.

Examples 12 and 13

Clear Coats with VOC 2.1

The following ingredients were mixed together to form a clear coat composition (CC 4) according to this invention and a comparative clear coat (CCC 2) using the oligoester according to comparative example 2.

The data in the following tables are parts by weight.

|  | Example | |
| --- | --- | --- |
|  | 12 (CC4) | 13 (CCC2) |
| Polyester oligomer 1 | 20 |  |
| Oligoester/comparative example 2 |  | 20 |
| Byk ® 331/Leveling agent from Byk Chemie | 0.06 | 0.06 |
| Propyleneglycol methylether acetate | 0.52 | 0.52 |

The CC4-blend was mixed with Desmodur® N3390 (hexamethylene diisocyanate trimer, 90% solids in butylacetate; Bayer) to a clear coat formulation at a NCO/OH ratio of 1.37. The mixture was then diluted to 19 seconds spray viscosity with methylamylketone. The formulation had a VOC of 2.1 lbs/gal. The clear coat was sprayed onto a steel panel precoated with a commercial primer surfacer and a commercial base coat and cured 30 minutes at 60° C. (dry film thickness of the clear coat: about 50 microns). The clear coat reached a Persoz hardness of about 220 and a Fisher hardness of about 8.5 after one day.

With the oligoester according to comparative example 2 it was impossible to formulate a clear coat with a VOC of 2.1 lbs/gal at spray viscosity. It was only possible to formulate with this oligoester a clear coat with a VOC of 3.5 lbs/gal at a spray viscosity of 19 seconds.

What is claimed is:

1. Coating compositions comprising:
A) at least one hydroxy-functional polyester with at least two hydroxyl groups per molecule, at least one of which hydroxyl groups is a tertiary hydroxyl group, wherein the polyester has a weight average molecular weight Mw of 200 to 5,000, and the polyester contains 10–90 wt-%, relative to the total quantity of polyester, of at least one acid ester group comprising a tertiary hydroxyl group and of the following general formula I

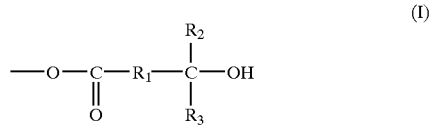

wherein $R_1$ is a single bond or a C1–C6 alkyl group, $R_2$ and $R_3$ mutually independently are a C1–C4 alkyl group,
B) optionally, at least one additional hydroxy-functional binder other than A) and
C) at least one cross-linking agent which is capable of entering into a cross-linking reaction with the OH-groups of components A) and B).

2. Coating compositions according to claim 1, wherein the hydroxy-functional polyester A) contains as a structural element 40–85 wt-%, relative to the total quantity of polyester, of at least one acid ester group of the general formula I.

3. Coating compositions according to claim 1, wherein the resin solids of the coating composition contain at least 2 wt-% of the polyester A).

4. Coating compositions according to claim 1, wherein A) and B) comprise 5–100 wt-% of polyester A) and 0–95 wt-% of additional hydroxy-functional binders B), wherein the total of weight percentages of A) and B) is 100 wt-%.

5. Coating compositions according to claim 1, wherein component B) comprises at least one poly(meth)acrylate.

6. Coating compositions according to claim 1, wherein component C) comprises at least one polyisocyanate.

7. Coating compositions according to claim 1, wherein component C) comprises at least one amine/formaldehyde condensation resin.

8. Coating compositions according to claim 1, wherein the hydroxy-functional polyester A) comprises the reaction product of:
Aa) 10–80 wt-% of at least one hydroxy-functional compound with at least two hydroxyl groups and a number average molecular weight Mn of 62–500, and
Ab) 20–90 wt-% of at least one hydroxy-functional ester of a monocarboxylic acid of the following general formula II

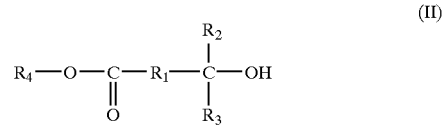

wherein $R_1$, $R_2$ and $R_3$ are defined in claim 1 and $R_4$ is a C1–C4-alkyl group and wherein the sum of the proportions of Aa) and Ab) are 100 wt-%.

9. Coating compositions according to claim 8, wherein component Aa) is a compound selected from the group consisting of monopentaerythritol, dipentaerythritol, trimethylolpropane, ditrimethylolpropane and mixtures thereof.

10. Coating compositions according to claim 8, wherein component Ab) is a compound selected from the group consisting of 2-hydroxyisobutyric acid methyl ester, 2-hydroxyisobutyric acid ethyl ester and combinations thereof.

11. A substrate coated with multiple layers of coatings wherein the outer-most layer comprises a clear coating of the composition of claim 1.

12. A substrate coated with multiple layers of coatings wherein at least one of the multiple layers of coatings comprises the composition of claim 1 containing pigment.

13. A process which comprises applying the coating composition of claim 1 onto a vehicle.

14. A process which comprises repairing the finish on a vehicle by applying the composition of claim 1.

* * * * *